US009917613B1

(12) United States Patent
Bacon et al.

(10) Patent No.: US 9,917,613 B1
(45) Date of Patent: Mar. 13, 2018

(54) FINE AND COARSE PHASE AND AMPLITUDE CONTROL

(71) Applicant: Peregrine Semiconductor Corporation, San Diego, CA (US)

(72) Inventors: Peter Bacon, Derry, NH (US); Matt Allison, Oceanside, CA (US); Ravindranath Shrivastava, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 15/414,213

(22) Filed: Jan. 24, 2017

(51) Int. Cl.
*H04B 1/40* (2015.01)
*H04B 15/00* (2006.01)

(52) U.S. Cl.
CPC .............. *H04B 1/40* (2013.01); *H04B 15/00* (2013.01)

(58) Field of Classification Search
USPC ........................................... 375/308; 455/42
See application file for complete search history.

(56) References Cited

U.S. PATENT DOCUMENTS

2016/0380623 A1  12/2016  Allison et al.

OTHER PUBLICATIONS

Hong, et al., "Applications of Self-Interference Cancellation in 5G and Beyond", IEEE Communications Magazine, vol. 52, No. 2, Feb. 2014, 9 pgs.
Halperin, et al., "Interference Cancellation: Better Receivers for a New Wireless MAC", www.researchgate.net, Aug. 2009, 6 pgs.

*Primary Examiner* — Eva Puente
(74) *Attorney, Agent, or Firm* — Jaquez Land Greenhaus LLP; Martin J. Jaquez, Esq.; John Land, Esq.

(57) ABSTRACT

A digitally controlled phase shifter and (optional) attenuator circuit that has both a broad range as well as a fine-tuning resolution. Embodiments maintain a full 360° phase range while providing $n^{th}$-bit least-significant bit (LSB) resolution across the entire range of possible phase shift and attenuation states, and compensate for the effect of frequency and/or PVT variations. In embodiments, two or more range partitionings can be defined that can be monotonic over respective sub-ranges while providing full coverage when combined. One such partitioning is a "coarse+fine" architecture. Embodiments of the coarse+fine architecture provide for greater than 360° of range for phase shifting and more than the total nominal design level for attenuation, and provide for fine ranges for both phase shifting and attenuation that are greater than the LSB of the corresponding coarse ranges for phase shifting and attenuation.

43 Claims, 10 Drawing Sheets

200

250

300

350

500

FINE AND COARSE PHASE AND AMPLITUDE CONTROL

BACKGROUND

(1) Technical Field

This invention relates to electronic circuitry, and more particularly to phase and amplitude control circuitry suitable for radio frequency signals.

(2) Background

Many modern electronic systems include radio frequency (RF) transceivers; examples include personal computers, tablet computers, wireless network components, televisions, cable system "set top" boxes, and cellular telephones. Many RF transceivers are quite complex two-way radios that transmit and receive RF signals across multiple frequencies in multiple bands; for instance, in the United States, the 2.4 GHz band is divided into 14 channels spaced 5 MHz apart. As another example, a modern "smart telephone" may include RF transceiver circuitry capable of concurrently operating on different cellular communications systems (e.g., GSM and CDMA), on different wireless network frequencies and protocols (e.g., IEEE 802.1bg at 2.4 GHz, and IEEE 802.1n at 2.4 GHz and 5 GHz), and on "personal" area networks (e.g., Bluetooth based systems).

Such RF transceivers often operate in "noisy" RF environments, which includes other devices with RF transceivers (e.g., wireless networks, cellular telephones and cell towers, and personal area networks), as well as devices that emit electromagnetic interference on frequencies of interest. For example, in the United States, devices that use the 2.4 GHz band includes wireless "WiFi" networks, microwave ovens, ISM band devices, security cameras, ZigBee devices, Bluetooth devices, video senders, cordless telephones, and baby monitors. Efforts have been made to overcome such noisy environments by using interference cancellation circuits to enable receivers to function well when signals are transmitted at the same time by different senders on the same channel or on adjacent channels.

In addition, even with a multitude of available channels, RF transceiver development has pushed towards greater spectral efficiency. Traditionally, RF transceivers have operated only in half-duplex modes, either transmitting or receiving—but not both simultaneously—on the same channel. For simultaneous two-way operation, separate frequency channels have been used for transmission and reception of RF signals. Efforts have been made to achieve full-duplex operation within a single frequency channel, which would essentially double spectral efficiency. However, full-duplex operation is hard to realize because when a radio transmits a signal some of the transmitted energy is received by its own receiver. Because the transmitted signal is generated locally, this unwanted self-interference energy may be billions of times (100 dB+) stronger than a desired receive signal. Efforts have been made to overcome this problem using self-interference cancellation circuits.

These forms of interference cancellation, as well as other applications, are driving a need for RF circuitry that provides both broad phase and amplitude control ranges, as well as finer resolutions. Electronic phase shifter circuits are used to change the transmission phase angle of a signal. Modern phase shifter circuits may be digitally controlled and thus provide a discrete set of phase shift states that are selected by a binary control word. Many phase shifter circuits also include a digitally controlled RF signal attenuator circuit that provides a discrete set of signal amplitude attenuation states that are also selected by a binary control word.

For example, FIG. 1A is a block diagram of a prior art digitally controlled phase shifter and attenuator circuit 100. An input signal RF_IN may be applied to a phase shifter array 102, which provides for a selectable degree of phase shift controlled by bit lines 104. For example, 6 bits provided over the bit lines 104 may select 64 different levels of phase shift. In this example, the output of the phase shifter array 102 is coupled to an attenuator array 106, which provides for a selectable level of attenuation controlled by bit lines 108. Again, as an example, 6 bits provided over the bit lines 108 may select 64 different levels of attenuation. The output of the attenuator array 106 is provided at RF_OUT.

The control bits for the illustrated phase shifter array 102 and the attenuator array 106 are provided through a digital control interface block 110. The digital control interface block 110 is generally a conventional design that has inputs for various voltages and circuit ground (V/Gnd), clock and control lines (Clk/Ctrl), and desired phase shift and attenuation states (Data). Control signals and phase shift and attenuation states may be provided through the well-known interfaces specified by the MIPI (Mobile Industry Processor Interface) Alliance, or through the well-known Serial Peripheral Interface (SPI) bus, or by direct signal pins, or by any other convenient means. A desired phase shift and attenuation state is provided from a source external to the digital control interface block 110 and converted to suitable bit lines 104, 108 to set state switches within the phase shifter array 102 and the attenuator array 106 to either bypass or engage an associated phase shifter or attenuator circuit cell.

FIG. 1B is a more detailed block diagram of the phase shifter array 102 of FIG. 1A. A set of phase shifter circuit cells 102-0 to 102-5 is series connected and each cell is configured to provide a selected degree of phase shift to an applied signal, or to allow an applied signal to pass through unchanged (i.e., the cell is bypassed). In this example, the cells 102-0 to 102-5 are approximately binary weighted such that the available degree of phase shift ranges from 0° (all cells bypassed) to 360° (all cells activated) using 6 control bits. Similarly, FIG. 1C is a more detailed block diagram of the attenuator array 106 of FIG. 1A. A set of attenuator circuit cells 106-0 to 106-5 is series connected and each cell is configured to provide a selected level of attenuation to an applied signal, or to allow an applied signal to pass through unchanged (i.e., the cell is bypassed). In this example, the cells 106-0 to 10659 are binary weighted such that the available amount of attenuation ranges from 0 dB (all cells bypassed) to 31.5 dB (all cells activated) using 6 control bits.

The present invention recognizes and addresses problems with conventional phase shifter and attenuator circuits, as described below.

SUMMARY OF THE INVENTION

The present invention encompasses a digitally controlled phase shifter and (optional) attenuator circuit that has both a broad range as well as a fine-tuning resolution of both amplitude and phase. Embodiments maintain a full 360° phase range while providing $n^{th}$-bit least-significant bit (LSB) resolution across the entire range of possible phase shift and attenuation states, and compensate for the effect of frequency and/or PVT variations on circuit cells.

In embodiments, two or more range partitionings can be defined that can be monotonic over respective sub-ranges while providing full coverage when combined. One such partitioning is a "coarse+fine" architecture. Embodiments of the coarse+fine architecture provide for greater than 360° of range for phase shifting and more than the total nominal design level for attenuation, and provide for fine ranges for both phase shifting and attenuation that are greater than the LSB of the corresponding coarse ranges for phase shifting and attenuation.

One embodiment comprises a digitally controlled phase shifter and attenuator circuit for selectively altering the phase and/or amplitude of an applied radio frequency (RF) signal, including: a coarse phase shifter array for providing a selectable degree of coarse phase shifting to the applied RF signal in response to a first digital control signal; a fine phase shifter array for providing a selectable degree of fine phase shifting to the applied RF signal in response to a second digital control signal; a coarse attenuator array for providing a selectable degree of coarse attenuation to the applied RF signal in response to a third digital control signal; a fine attenuator array for providing a selectable degree of fine attenuation to the applied RF signal in response to a fourth digital control signal; and a digital control interface, coupled to the coarse and fine phase shifter arrays and the coarse and fine attenuator arrays, for generating the first, second, third, and fourth digital control signals in response to applied phase and attenuation state data.

One of the benefits of the coarse+fine architecture is that it facilitates programming speed and supports an efficient method for determining and setting (i.e., tuning) phase and attenuation states. With respect to the tuning method, instead of working with a single large N-bit array as in the prior art, embodiments of the coarse+fine architecture work with two smaller arrays, an X-bit coarse array and an (N−X)-bit fine array, where N it the number of control bits for both arrays combined, and X is the number of bits partitioned to the coarse array alone. However, despite using two arrays, the same tuning method can be used for both arrays, provided that the fine-tuning range is greater than the LSB of the coarse-tuning range. This margin in tuning coverage can account for such factors as PVT variations and frequency dependencies.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

The present invention encompasses a digitally controlled phase shifter and (optional) attenuator circuit that has both a broad range as well as a fine-tuning resolution of both amplitude and phase. Embodiments maintain a full 360° phase range while providing $n^{th}$-bit least-significant bit (LSB) resolution across the entire range of possible phase shift and attenuation states, and compensate for the effect of frequency and/or PVT variations on circuit cells.

Recognition of the Problems with Conventional Circuits

The inventor has recognized that, in order to support interference cancellation and other applications in a dynamic radio frequency (RF) environment, there is the need to provide both a broad range as well as a fine-tuning resolution of both amplitude and phase. Multi-path effects, differing antenna configurations, and unique transmitting/receiving environments all require a very broad range of amplitude control. These effects can readily span an amplitude range of more than 30 dB in comparison with the original transmitted and/or received signals. In the following embodiments and description (and by way of example only), a maximum 32 dB attenuation range is used with the most significant bit (MSB) set to 16 dB (32 dB/2). However, in some applications, a different attenuation range and different MSBs may be used. With respect to phase, a maximum phase shift range of 360° is needed to align any one distinct signal with a replica signal that is varied in phase.

Figure 1A:
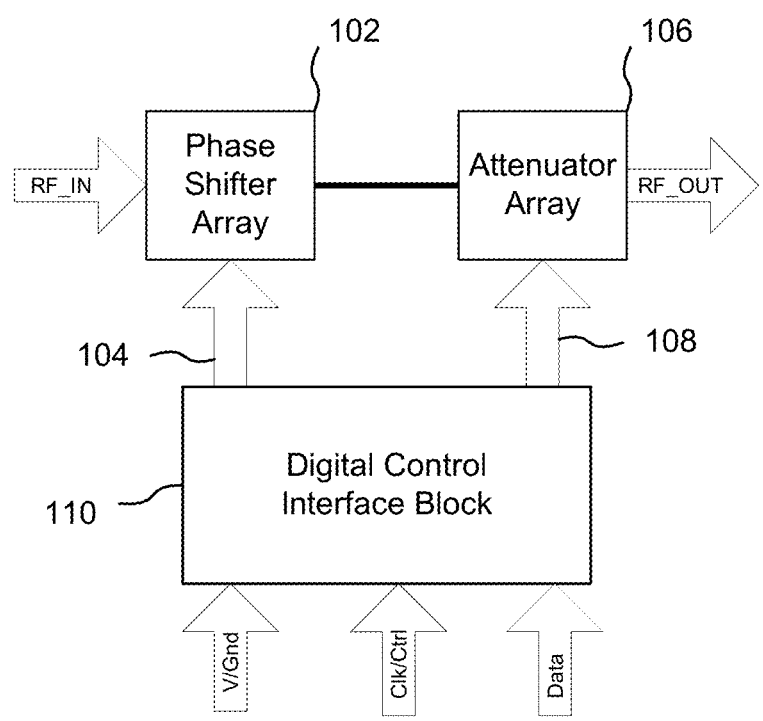
FIG. 1A is a block diagram of a prior art digitally controlled phase shifter and attenuator circuit.
Figure 1B:
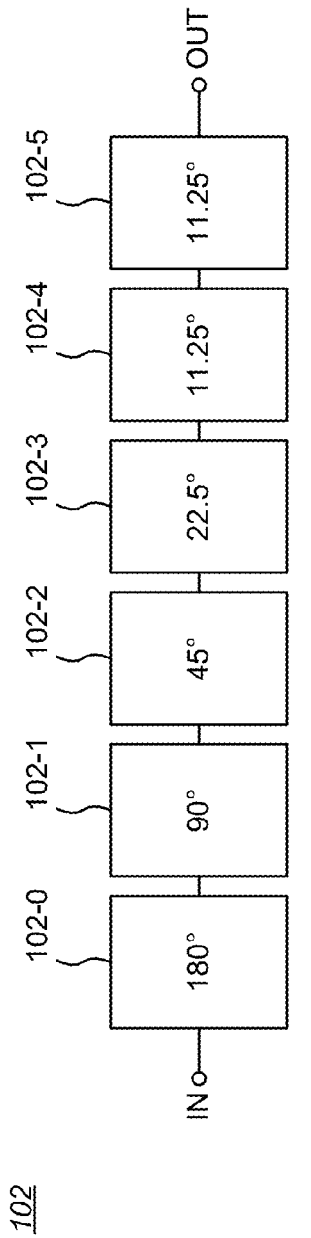
FIG. 1B is a more detailed block diagram of the phase shifter array of FIG. 1A.
Figure 1C:
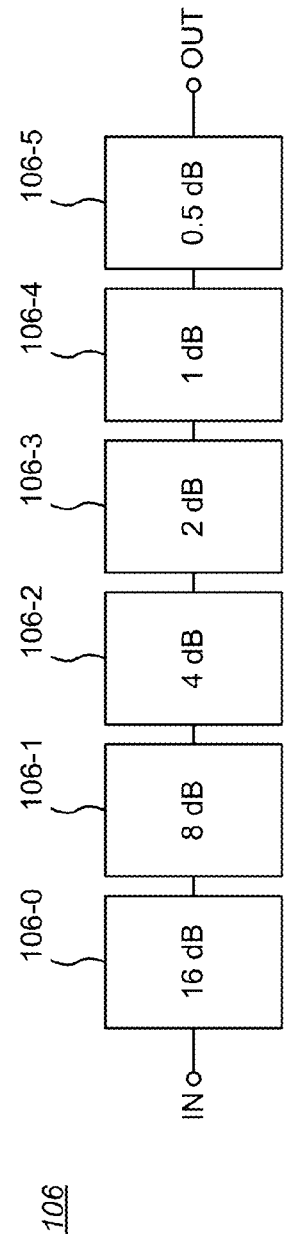
FIG. 1C is a more detailed block diagram of the attenuator array of FIG. 1A.
Figure 2A:
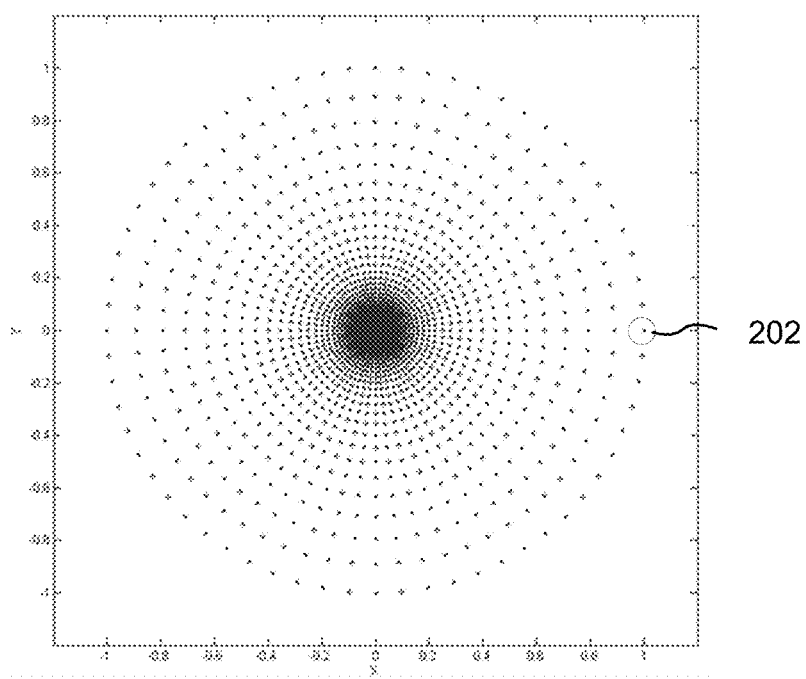
FIG. 2A is a polar plot of the corresponding vector points derived from the attenuation and phase values of an ideal 6-bit phase shifter and attenuator circuit.
Figure 2B:
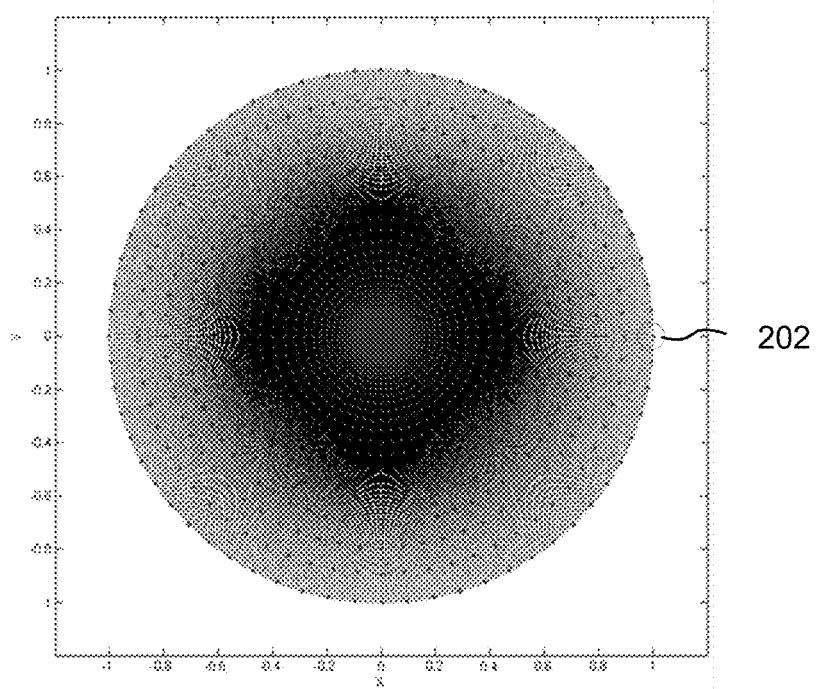
FIG. 2B is a polar plot of the corresponding vector points derived from the attenuation and phase values of an ideal 10-bit phase shifter and attenuator circuit, over which the values from FIG. 2A are overlaid for purposes of comparison.

To support more than 40 dB level of interference cancellation in the RF domain of a transceiver, the phase shift and attenuation resolutions need to be on the order of 0.3° and 0.03 dB, respectively. To illustrate the need for higher resolution of both amplitude and phase, FIG. 2A is a polar plot 200 of the corresponding vector points derived from the attenuation and phase values of an ideal 6-bit phase shifter and attenuator circuit; a particular attenuation/phase vector point 202 is shown circled. FIG. 2B is a polar plot 250 of the corresponding vector points derived from the attenuation and phase values of an ideal 10-bit phase shifter and attenuator circuit, over which the values from FIG. 2A are overlaid for purposes of comparison. As can be seen, the constellation of achievable attenuation and phase values of the 6-bit ideal embodiment is rather sparsely spaced compared to the much denser constellation of achievable attenuation and phase values of the 10-bit ideal embodiment. [Note: For this and all other polar plots described below, the X & Y axes are defined by the following polar values (amplitude & phase): X=10^(Att_dB/10)*cos(Phase), and Y=10^(Att_dB/10)*sin(Phase), where the attenuation Att_dB of 0 dB=1.0, cos(45°)=0.7071, and sin(45°)=0.7071. Thus, X(0 dB, 45°)=1.0*0.7071=0.7071, and Y(0 dB, 45°)= 1.0*0.7071=0.7071.]

However, as resolutions approach 0.3° of phase shift (0.08% of 360°) and 0.03 dB of attenuation (0.06% of 32 dB, by way of example) for fine control in RF systems, particularly in interference cancellation applications, maintaining a full 360° phase range while providing $n^{th}$-bit least-significant bit (LSB) resolution across the entire range of possible phase shift and attenuation states becomes virtually impossible. Without monotonicity, system level programming and tuning algorithms become very convoluted.

A further problem with conventional digitally controlled binary-weighted phase shifter and attenuator circuits (particularly phase shifter circuits) is that the amount phase shift or attenuation provided may vary with frequency, and as a function of process, voltage, and temperature (PVT) variations among different integrated circuits (ICs) implementing such circuits. Thus, for instance, a phase shifter circuit cell designed to provide X° of phase shift typically may vary by ±3% or more as a function of frequency and/or PVT variations. For example, TABLE 1 shows nominal values for binary-weighted phase shifter circuit cells of one modeled 11-bit array, and the corresponding computed phase values.

TABLE 1

| Bit | Phase ° | −3% | +3% |
| --- | --- | --- | --- |
| 0 | 180 | 174.6 | 185.4 |
| 1 | 90 | 87.3 | 92.7 |
| 2 | 45 | 43.65 | 46.35 |
| 3 | 22.5 | 21.83 | 23.18 |
| 4 | 11.25 | 10.91 | 11.59 |
| 5 | 5.625 | 5.46 | 5.79 |
| 6 | 2.813 | 2.728 | 2.897 |
| 7 | 1.406 | 1.364 | 1.448 |
| 8 | 0.703 | 0.682 | 0.724 |
| 9 | 0.352 | 0.341 | 0.362 |
| 10 | 0.176 | 0.171 | 0.181 |

Figure 3A:
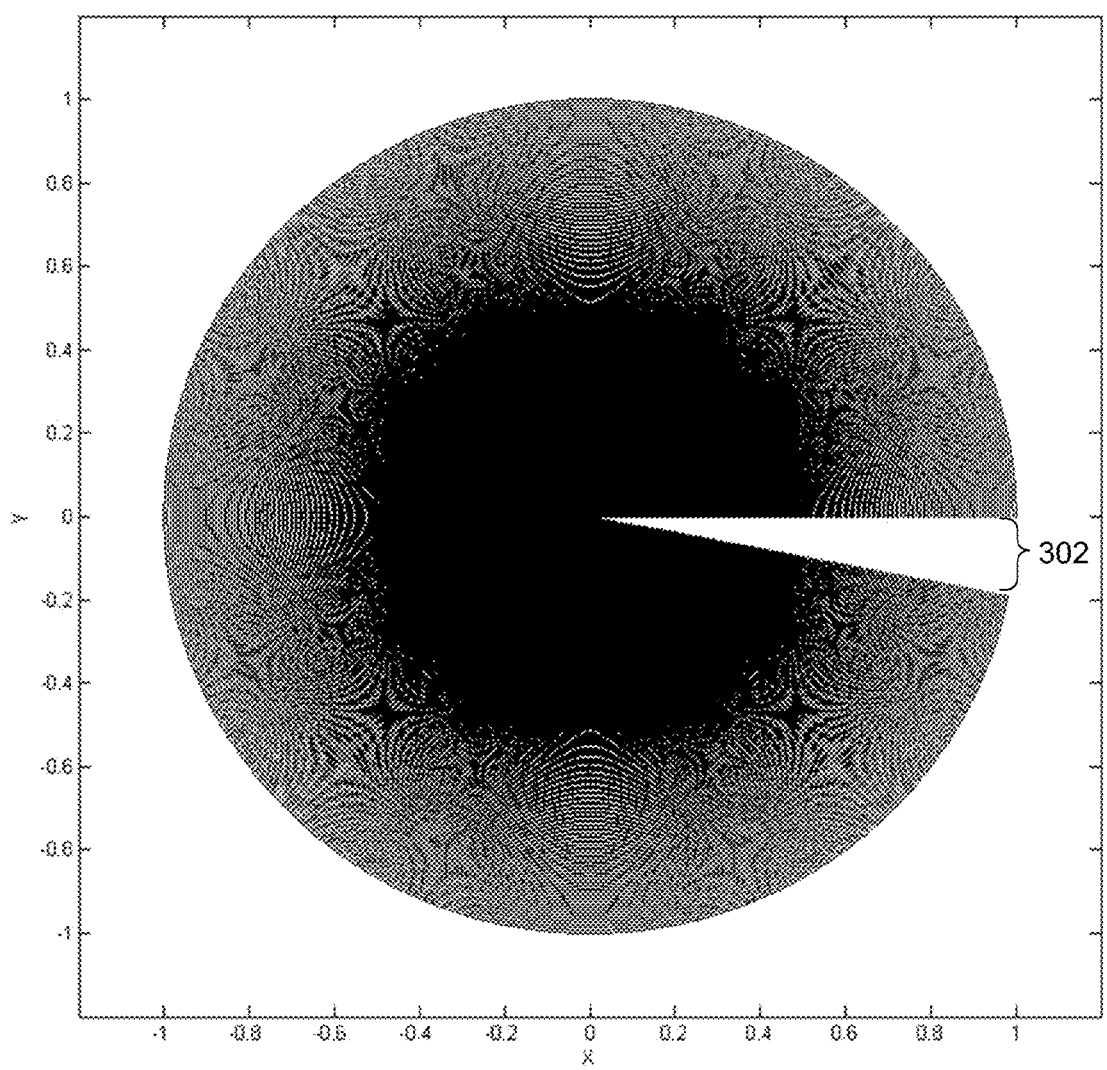
FIG. 3A is a polar plot of the corresponding vector points derived from the attenuation and phase values for a first modeled embodiment of a 10-bit digitally controlled phase shifter and attenuator circuit having uniform phase variance among constituent circuit cells.

FIG. 3A is a polar plot 300 of the corresponding vector points derived from the attenuation and phase values for a first modeled embodiment of a 10-bit digitally controlled phase shifter and attenuator circuit having uniform phase variance among constituent circuit cells. In this example, each phase shifter circuit cell exhibits a −3% error in actual phase shift value versus nominal phase shift value, each attenuator circuit cell has essentially zero error, and phase is set assuming binary-weighted cells. As shown by the gap or hole 302 in coverage, the phase shifter component of the circuit cannot provide a complete 360° phase shift range. Note that the modeled embodiment is a theoretical extension to 10-bits of a conventional 6-bit design.

Figure 3B:
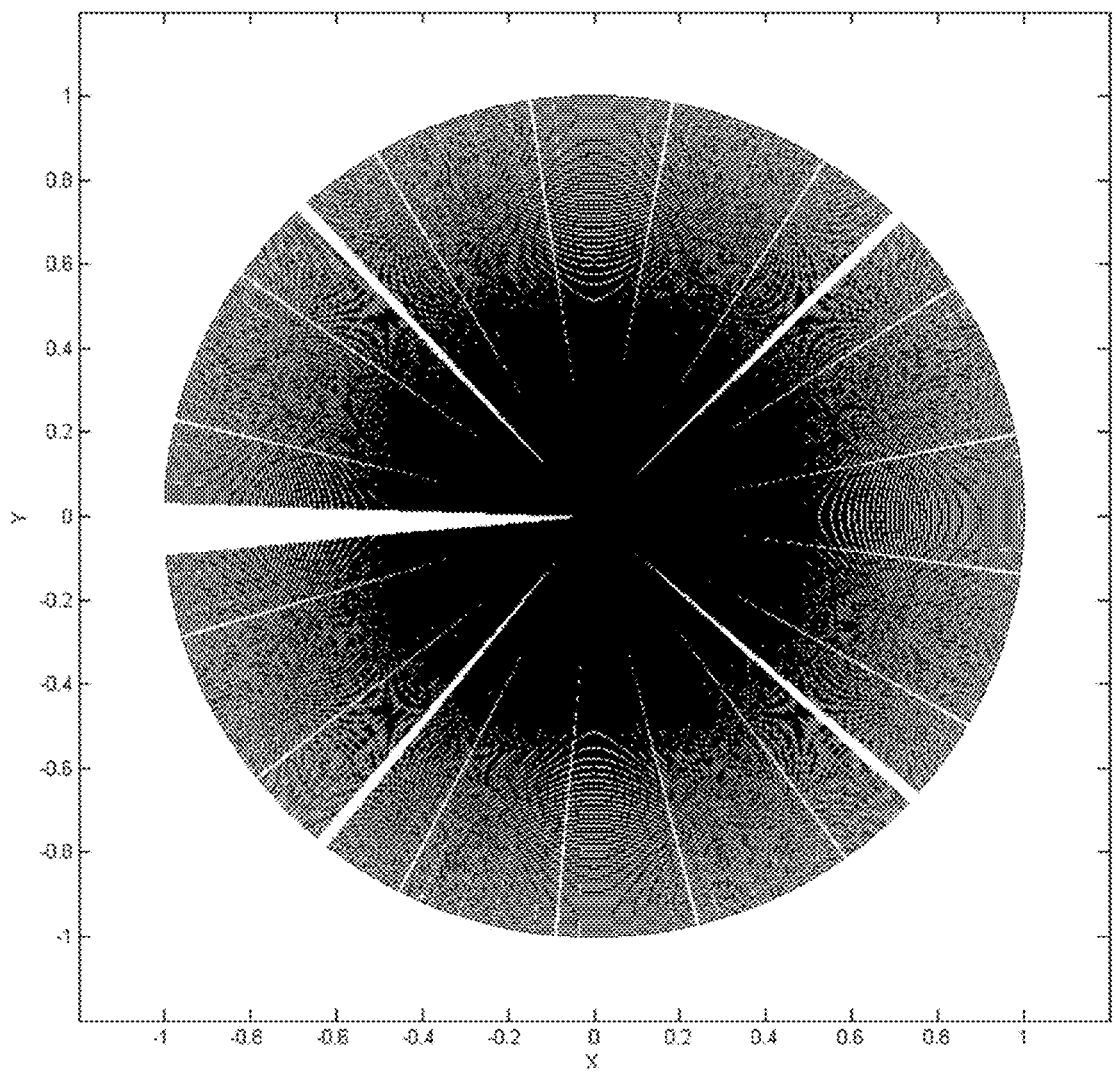
FIG. 3B is a polar plot of the corresponding vector points derived from the attenuation and phase values for a second modeled embodiment of a 10-bit digitally controlled phase shifter and attenuator circuit having non-uniform phase variance among constituent circuit cells.

In addition, each phase shifter circuit cell within a phase shifter array may have variances that are opposite (i.e., some cells increase, some decrease) as a function frequency and/or PVT variations. The result is that, for some conditions, the amount of available phase shift and attenuation may be insufficient to provide a full range of coverage. For example, FIG. 3B is a polar plot 350 of the corresponding vector points derived from the attenuation and phase values for a second modeled embodiment of a 10-bit digitally controlled phase shifter and attenuator circuit having non-uniform phase variance among constituent circuit cells. In this example, phase variance differs by bit (i.e., odd phase shifter circuit cells exhibit a −3% error in actual phase shift value versus nominal phase shift value, and even phase shifter circuit cells exhibit a +3% error in actual phase shift value versus nominal phase shift value), each attenuator circuit cell has essentially zero error, and phase is set assuming binary-weighted cells. As shown by the multiple wedge-shaped gaps in coverage, the phase shifter component of the circuit cannot achieve numerous phase shift states between 0° and 360°. Again, the modeled embodiment is a theoretical extension to 10-bits of a conventional 6-bit design.

As noted above, for some interference cancellation applications, more than 40 dB level of interference cancellation is required. Using calculations for a straight-line error vector magnitude (EVM)—a measure used to quantify the performance of a digital radio transmitter or receiver—and starting with total ranges of 32 dB for attenuation and 360° for phase shift, the inventor has determined that 10 control bits for attenuation states and 10 control bits for phase shift states supports approximately 43 dB of interference cancellation, while 10 control bits for attenuation states and 11 control bits for phase shift states supports approximately 47 dB of interference cancellation. With conventional circuits, achieving monotonicity over this entire range with a traditional binary-weighted scheme is virtually impossible. While complex look-up tables (LUTs) could be used in conjunction with several tuning bits to try to assure monotonicity, there would be a negative impact on total insertion loss due to the added circuitry.

Coarse+Fine Partitioning of Phase and Attenuation Ranges

In various embodiments of the present invention, rather than struggle with monotonicity over an entire wide range with fine resolution, two or more range partitionings can be defined that can be monotonic over respective sub-ranges while providing full coverage when combined together. One such partitioning is simply referred to as a "coarse+fine" architecture.

As an example, a binary-weighted architecture using a control word of 8 bits can be broken into two partitions, coarse and fine. The states of the coarse partition could be set by the 3 most significant bits (MSBs) of the control word, while states of the fine partition could be set by the 5 least significant bits (LSBs) of the control word. Maintaining monotonicity over these independent partitions separately is easier than doing so over the full 8-bit range with fine resolution. A coarse+fine architecture is even more useful as the number of control bits increases. In the following examples, two partitions are shown, but the concepts are extensible to higher levels of partitioning and higher level bit counts, as further described below.

Figure 4A:
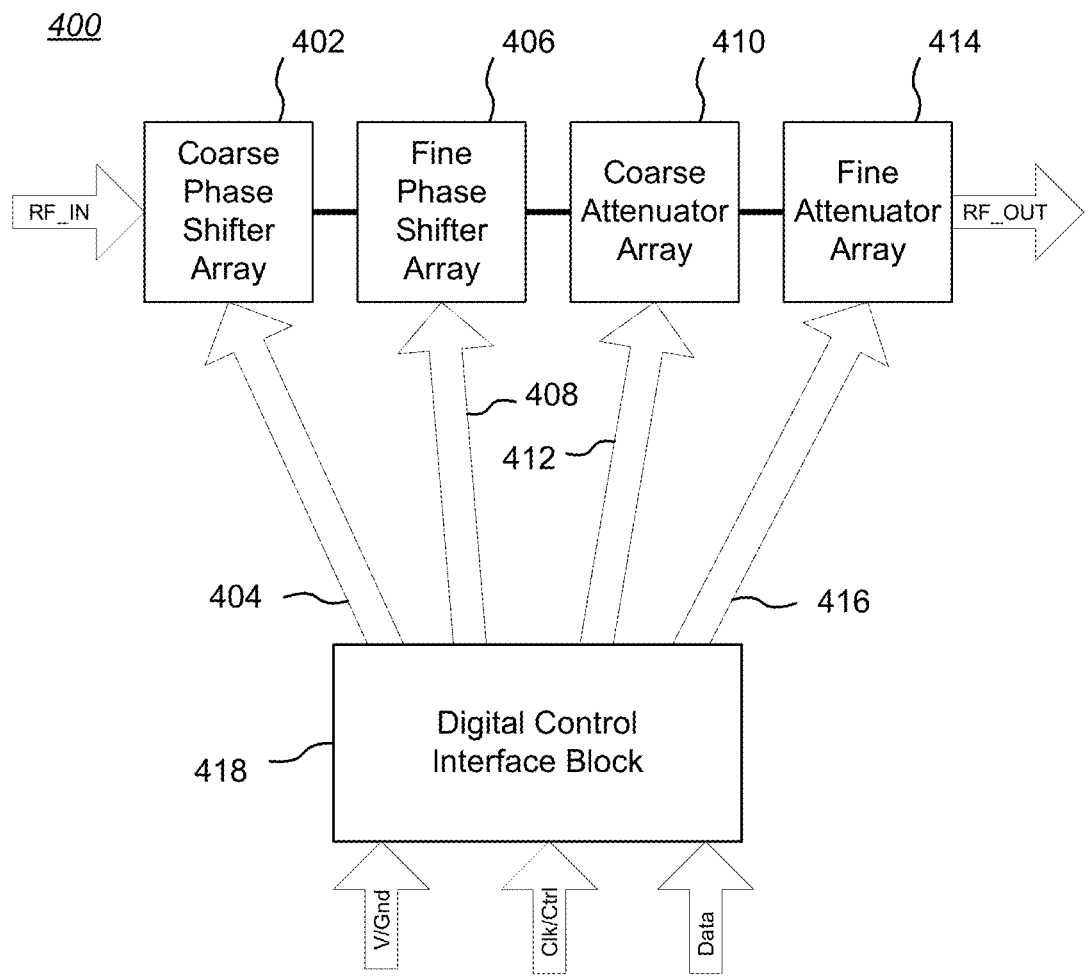
FIG. 4A is a block diagram of one embodiment of digitally controlled phase shifter and attenuator circuit having a coarse+fine architecture.

FIG. 4A is a block diagram of one embodiment of digitally controlled phase shifter and attenuator circuit 400 having a coarse+fine architecture. In the illustrated embodiment, an input signal RF_IN may be applied to a coarse phase shifter array 402, which provides for a selectable degree of coarse phase shift controlled by bit lines 404; for example, 5 bits may select 32 different levels of coarse phase shift. In this particular embodiment, the output of the coarse phase shifter array 402 is coupled to a fine phase shifter array 406, which provides for a selectable degree of fine phase shift controlled by bit lines 408; for example, 6 bits may select 64 different levels of fine phase shift. In this example, the output of the fine phase shifter array 406 is coupled to a coarse attenuator array 410, which provides for a selectable level of coarse attenuation controlled by bit lines 412. As an example, 5 bits may select 32 different levels of coarse attenuation. The output of the coarse attenuator array 410 is coupled to a fine attenuator array 414, which provides for a selectable level of fine attenuation controlled by bit lines 416; for example, 32 different levels of fine attenuation (5 bits). The output of the fine attenuator array 414 is provided at RF_OUT. The control bits for the illustrated phase shifter and attenuator arrays 402, 406, 410, and 414 are provided through a digital control interface block 418.

Although the partitioning of circuit function in FIG. 4A is shown with a certain sequence for simplicity and clarity, the serial RF connection of bits can be completely intertwined within the embodiment, from individual bit-level ordering to the higher level fine/coarse range ordering. That is, the RF connection of serially-connected bits can be in any physical order; the control line connections to the digital control interface block 418 determine the partitioning of individual bits into functional (phase and amplitude) and range (coarse and fine) partitioning. Thus, the order of the arrays 402, 406, 410, and 414 may be varied from the order shown. Further, while shown as separate component blocks, one or more of the arrays 402, 406, 410, and 414 may be combined into a common component block. However, of importance, the coarse arrays 402, 410, are separately controlled from the fine arrays 406, 414, as described in further detail below.

Another important aspect of a coarse+fine architecture that helps overcome the problems of simple binary-weighted schemes is that embodiments of the architecture provide for one or more of the following characteristics: (1) greater than 360° of range for phase shifting and/or more than the total nominal design level for attenuation, and (2) at least one fine range for at least one of phase shifting and/or attenuation that is greater than the LSB of the corresponding next coarser range for phase shifting and/or attenuation.

Figure 4B:
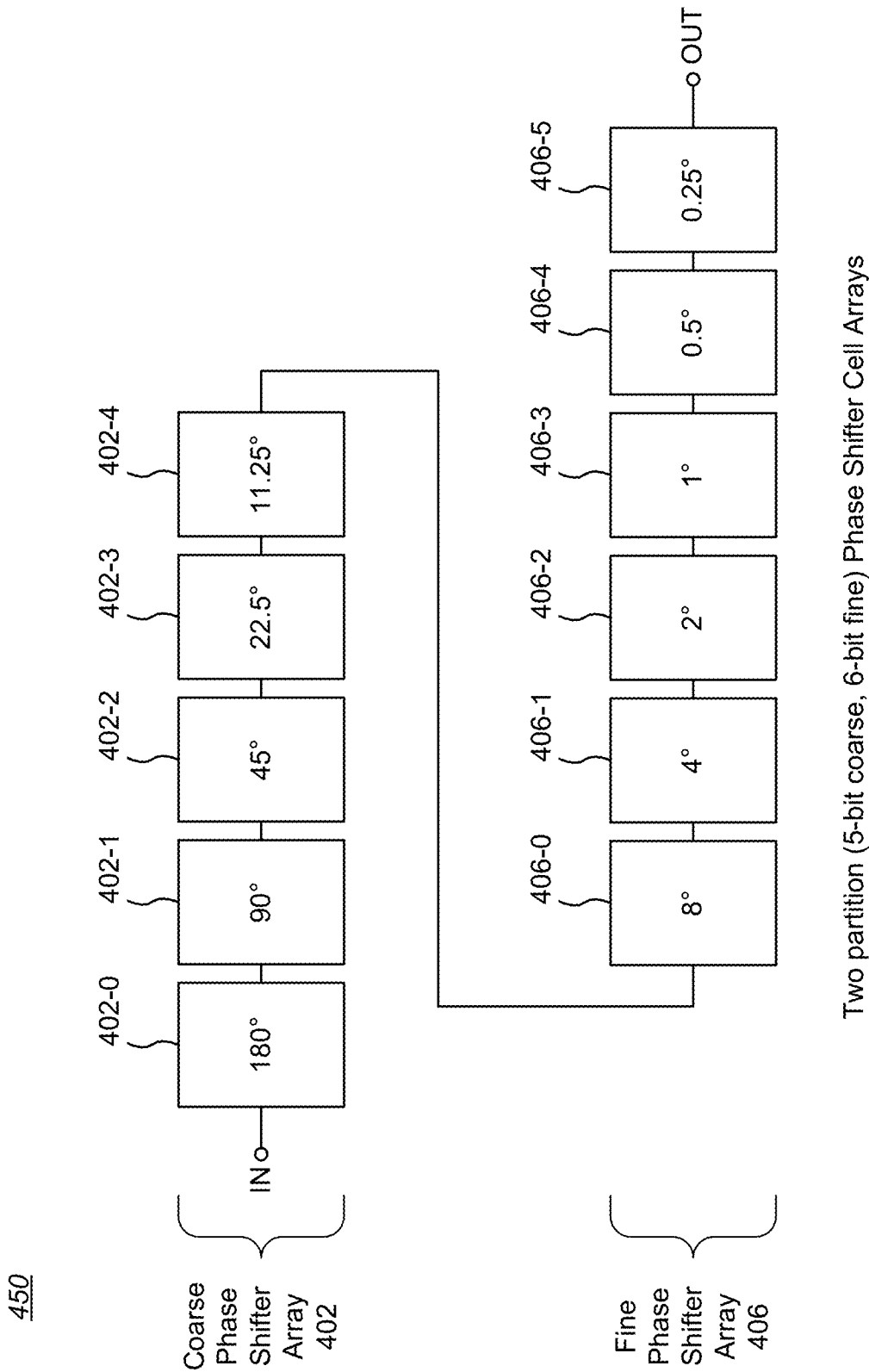
FIG. 4B is a more detailed block diagram of the coarse and fine phase shifter arrays of FIG. 4A.

For example, FIG. 4B is a more detailed block diagram 450 of the coarse and fine phase shifter arrays 402, 406 of FIG. 4A. In this example, the coarse phase shifter array 402 includes a set of 5 series-connected phase shifter circuit cells 402-0 to 402-4, with each cell configured to provide a selected degree of phase shift to an applied signal. In this example, the coarse cells 402-0 to 402-4 are approximately binary weighted and can provide up to 348.75° of phase shift range, with the LSB being (nominally) 11.25°.

The fine phase shifter array 406 in FIG. 4B includes a set of 6 series-connected phase shifter circuit cells 406-0 to 406-5, with each cell configured to provide a selected degree of phase shift to an applied signal. The fine cells 406-0 to 406-5 are also approximately binary weighted, but in a sequence not closely related to the binary weighting of the coarse cells 402-0 to 402-4. In this example, the fine cells 406-0 to 406-5 provide up to 15.75° of phase shift range.

Accordingly, the fine cells 406-0 to 406-5 provide a phase shift range (15.75° in this example) that is greater than the LSB of the coarse cells 402-0 to 402-4 (11.25° in this example), and also exceeds the corresponding nominal phase shift range (11.25°) of a conventional binary-weighted phase shifter array with the same number of cells. In addition, the total phase shift available from both the coarse and fine phase shifter arrays 402, 406 is greater than 360° (364.5° in this example), and thus exceeds the corresponding total nominal phase shift range of a conventional binary-weighted phase shifter array with the same number of cells.

The extended range of the combination of the coarse and fine phase shifter arrays 402, 406 provides excess phase shift range to cover frequency and/or PVT variations for the arrays 402, 406 as a whole. Thus, full coverage is achieved if the binary weighting range is increased to absorb frequency and/or PVT variations, regardless of specific coarse versus fine partitioning of cells. In addition, the extended range of the fine cells 406-0 to 406-5 relative to the LSB of the coarse cells 402-0 to 402-4 provides excess inter-cell phase shift range to compensate for opposite frequency and/or PVT variations within the arrays 402, 406. Of course, for applications where frequency and/or PVT variations may be even greater, the specific cell values of the coarse and fine phase shifter arrays 402, 406 may be varied from the example values shown in FIG. 4B.

Thus, more generally, embodiments of the invention provide at least one of two levels of PVT/frequency variation margin for phase: (1) full range, meaning that the minimum combined phase range must be sufficiently greater than 360° so as to cover PVT/frequency variations; and/or (2) inter-range, meaning that at least one fine range overlaps a next coarser range LSB sufficiently to cover the PVT/frequency variations of the next coarser range.

Figure 4C:
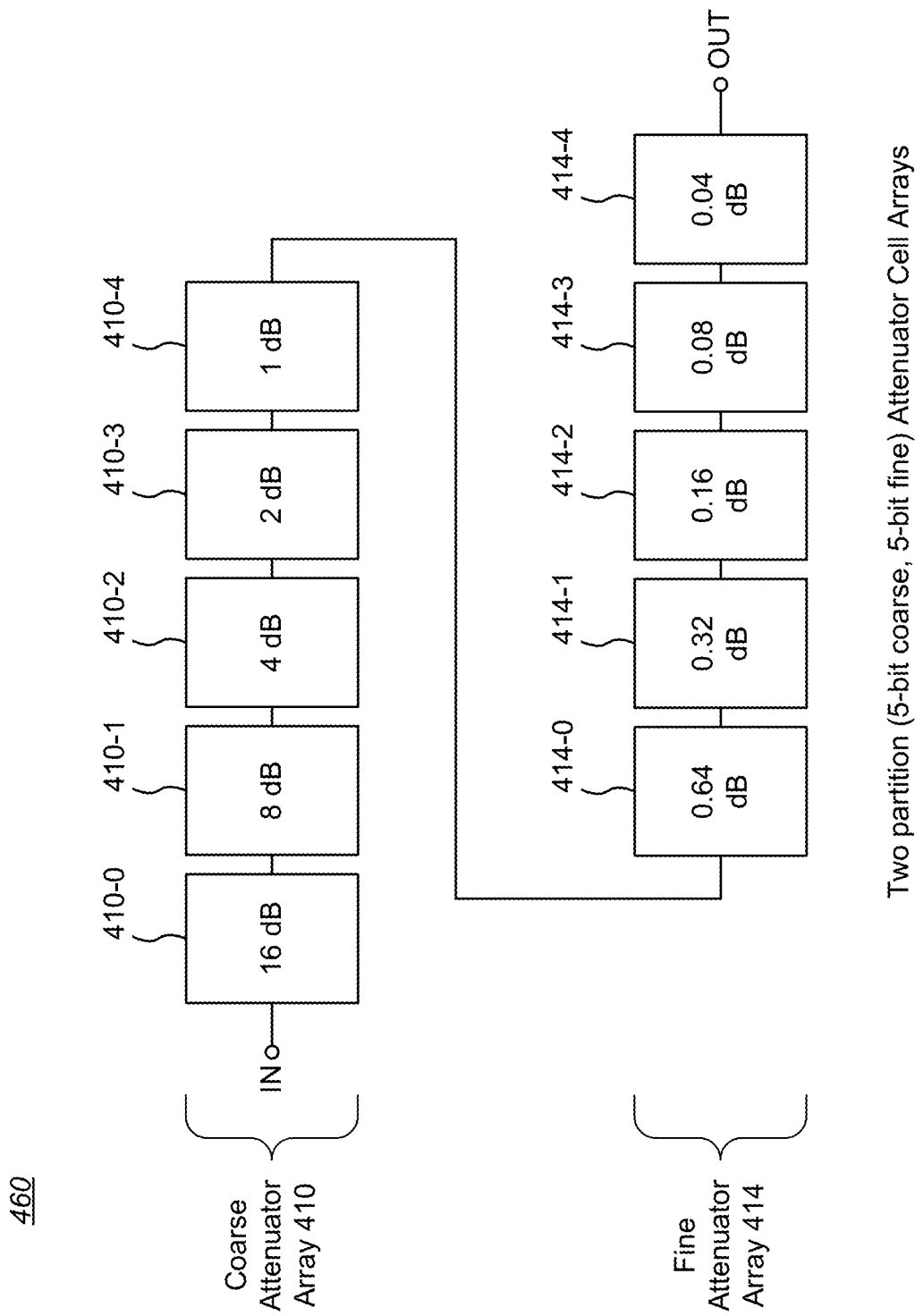
FIG. 4C is a more detailed block diagram of the coarse and fine attenuator arrays of FIG. 4A.

Similarly, FIG. 4C is a more detailed block diagram 460 of the coarse and fine attenuator arrays 410, 414 of FIG. 4A. In this example, the coarse attenuator array 410 includes a set of 5 series-connected attenuator circuit cells 410-0 to 410-4, with each cell configured to provide a selected level of attenuation to an applied signal. In this example, the coarse cells 410-0 to 410-4 are approximately binary weighted and can provide up to 31 dB of attenuation range, with the LSB being (nominally) 1 dB.

The fine attenuator array 414 in FIG. 4C includes a set of 5 series-connected attenuator circuit cells 414-0 to 414-4, with each cell configured to provide a selected degree of attenuation to an applied signal. The fine cells 414-0 to 414-4 are also approximately binary weighted, but in a sequence not closely related to the binary weighting of the coarse cells 410-0 to 410-4. In this example, the fine cells 414-0 to 414-4 provide up to 1.24 dB of attenuation range.

Accordingly, the fine cells 414-0 to 414-4 provide an attenuation range that is greater than the LSB of the coarse cells 410-0 to 410-4 (1 dB in this example), and also exceeds the corresponding nominal attenuation range (0.97 dB) of a conventional binary-weighted phase shifter array with the same number of cells. In addition, the total attenuation available from both the coarse and fine attenuator arrays 410, 414 is greater than 31.97 dB (i.e., 32.24 dB in this example), and thus exceeds the corresponding total nominal attenuation range of a conventional binary-weighted attenuation array with the same number of cells. The 32.24 dB range (factor of 1674.9) versus 31.97 dB range (factor of 1573.5) equates to about 6.4% of "overlap" or "margin". This level of excess attenuation range was deemed sufficient to account for the PVT/frequency variations associated with the specific embodiment. More generally, having at least 2% overlap is desirable, and in most applications, having at least a 5% overlap is sufficient to provide a full range of coverage.

The extended range of both the coarse and fine attenuator arrays 410, 414, provides excess attenuation range to cover frequency and/or PVT variations for the arrays 410, 414 as a whole. Thus, full coverage is achieved if the binary weighting range is increased to absorb frequency and/or PVT variations, regardless of specific coarse versus fine partitioning of cells. In addition, the extended range of the fine cells 414-0 to 414-4 relative to the LSB of the coarse cells 410-0 to 410-4 provides excess inter-cell attenuation range to compensate for opposite frequency and/or PVT variations within the arrays 410, 414. Again, for applications where frequency and/or PVT variations may be even greater, the specific cell values of the coarse and fine attenuator arrays 410, 414 may be varied from the example values shown in FIG. 4C.

Thus, more generally, embodiments of the invention that include an attenuator component provide at least one of two levels of PVT/frequency variation margin for attenuation: (1) full range, meaning that the minimum combined attenuation range exceeds a specified nominal level of attenuation for a particular application sufficiently to cover PVT/frequency variations; and/or (2) inter-range, meaning that at least one finer range overlaps a next coarser range LSB sufficiently to cover the PVT/frequency variations of the next coarser range.

Subject to the constraints noted above regarding having at least one of (1) excess full range coverage for at least one of phase shifting and attenuation sufficient to cover PVT/frequency variations, and/or (2) at least one fine range for at least one of phase shifting and attenuation that is sufficiently greater than the LSB of the corresponding next coarser range for phase shifting and attenuation to cover PVT/frequency variations, the total number of phase shifter and/or attenuator cells, the specific partitioning of phase shifter and/or attenuator cells to either a coarse array or a fine array, and the specific values of such cells is a matter of design choice. In general, it has been found that most applications benefit from embodiments of the invention that use 9 bits or more of resolution for phase shifting alone, or 9 bits or more of resolution for attenuation alone, or 7 bits or more of resolution for phase shifting and attenuation combined.

Figure 5:
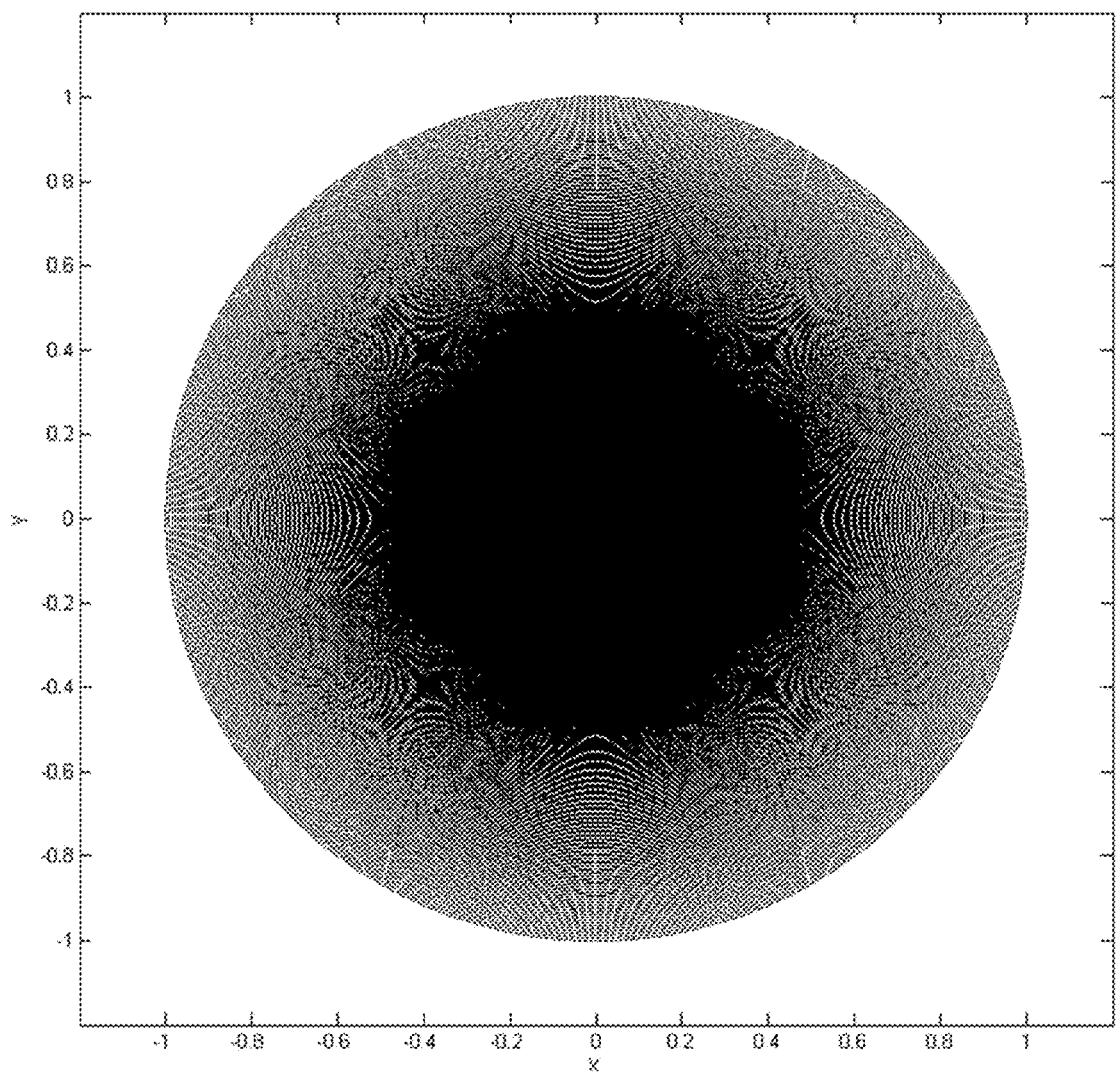
FIG. 5 is a polar plot of the corresponding vector points derived for a modeled embodiment of a digitally controlled 10-bit phase shifter and attenuator circuit having a coarse+fine architecture.

FIG. 5 is a polar plot 500 of the corresponding vector points derived for a modeled embodiment of a digitally controlled 10-bit phase shifter and attenuator circuit having a coarse+fine architecture. Due to the excess full range coverage for both phase shifting and attenuation, and having a fine range for both phase shifting and attenuation that is sufficiently greater than the LSB of the corresponding coarse range for phase shifting and attenuation to cover PVT/frequency variations, no holes in coverage exist.

While the examples given above for the coarse and fine arrays 402, 406, 410, and 414 are approximately binary weighted, other weighting schemes may be used. For example, the coarse arrays 402, 410 may be binary weighted, while the fine arrays 406, 414 may be thermometer weighted, or have a hybrid binary/thermometer weighting. For example, TABLE 2 shows a coarse (bits "#c") and fine (bits "#f") partitioning of one modeled phase shifter array with nominal phase shift value compared to computed values at various frequencies. As can be seen, the fine partitioning includes thermometer weighted values of 4° (bits 6-f-8f) and 1° (bits 9f-11f), as well as binary-weighted values (bits 12f and 13f, relative to 11f).

TABLE 2

| Bit | Nominal Phase | 1.70 GHz | 1.95 GHz | 2.20 GHz |
|---|---|---|---|---|
| 1c | 180 | 193 | 196 | 199 |
| 2c | 90 | 96.5 | 98 | 100 |
| 3c | 45 | 48 | 49 | 50 |
| 4c | 22.5 | 20 | 24.5 | 28.5 |
| 5c | 11.25 | 10.75 | 12.25 | 15.25 |
| 6f | 4.00 | * | 4.06 | * |
| 7f | 4.00 | * | 3.95 | * |
| 8f | 4.00 | * | 4.08 | * |
| 9f | 1.00 | * | 1.110 | * |
| 10f | 1.00 | * | 1.125 | * |
| 11f | 1.00 | * | 0.935 | * |
| 12f | 0.50 | * | 0.600 | * |
| 13f | 0.25 | * | 0.286 | * |

* not measured at this frequency; all values in degrees

The teachings above regarding a coarse+fine partitioned architecture can be extended to additional partitions, and the partitions may be a combination of one or more digitally controlled phase shifters and digitally controlled attenuators. For example, more generally, the invention encompasses a digitally controlled circuit for selectively altering at least one of phase of an applied radio frequency (RF) signal and attenuation of the applied RF signal, including: n series-coupled circuit arrays, where n≥2, each circuit array having a least significant bit (LSB) phase shift or attenuation state, and at least one of the n circuit arrays having a range of phase shift or attenuation states that exceeds the LSB phase shift or attenuation state of a coupled different circuit array.

As another example, the invention encompasses a digitally controlled phase shifter circuit for selectively altering the phase of an applied radio frequency (RF) signal, including a coarse phase shifter array having a least significant bit (LSB) phase shift state, and a fine phase shifter array, coupled to the coarse phase shifter array, and having a range of phase shift states that exceeds the LSB phase shift state of the coarse phase shifter array.

As yet another example, the invention encompasses a digitally controlled attenuation circuit for selectively attenuating an applied radio frequency (RF) signal, including a coarse attenuation array having a least significant bit (LSB) attenuation state, and a fine attenuation array, coupled to the coarse attenuation array, and having a range of attenuation states that exceeds the LSB attenuation state of the coarse attenuation array.

Calibration and Operation

One of the benefits of the coarse+fine architecture is that it facilitates programming speed and supports an efficient method for determining and setting (i.e., tuning) phase and attenuation states. With respect to the tuning method, instead of working with a single large N-bit array, embodiments of the coarse+fine architecture work with two smaller arrays, an X-bit coarse array and an (N−X)-bit fine array, where N it the number of control bits for both arrays combined, and X is the number of bits partitioned to the coarse array alone. However, despite using two arrays, the same tuning method can be used for both arrays, provided that the fine-tuning range is greater than the LSB of the coarse-tuning range. This margin in tuning coverage will eliminate such factors as PVT variations, and any frequency dependencies.

One tuning method compares the phase and amplitude of one vector against another vector and selects the setting that results in better characteristics (which in the present example application is vector cancellation), repeating the process for the entire range of vectors. In the present example application, the two vectors are not looked at individually; instead, the combination of the two vectors is measured and the level of the "canceled" signal assessed. Preferably, both coarse phase and attenuation ranges are looked at first and optimized, then the fine phase and attenuation ranges are optimized. For simplicity, only phase optimization is described in the following text, but generally both phase and amplitude are optimized together.

Figure 6:
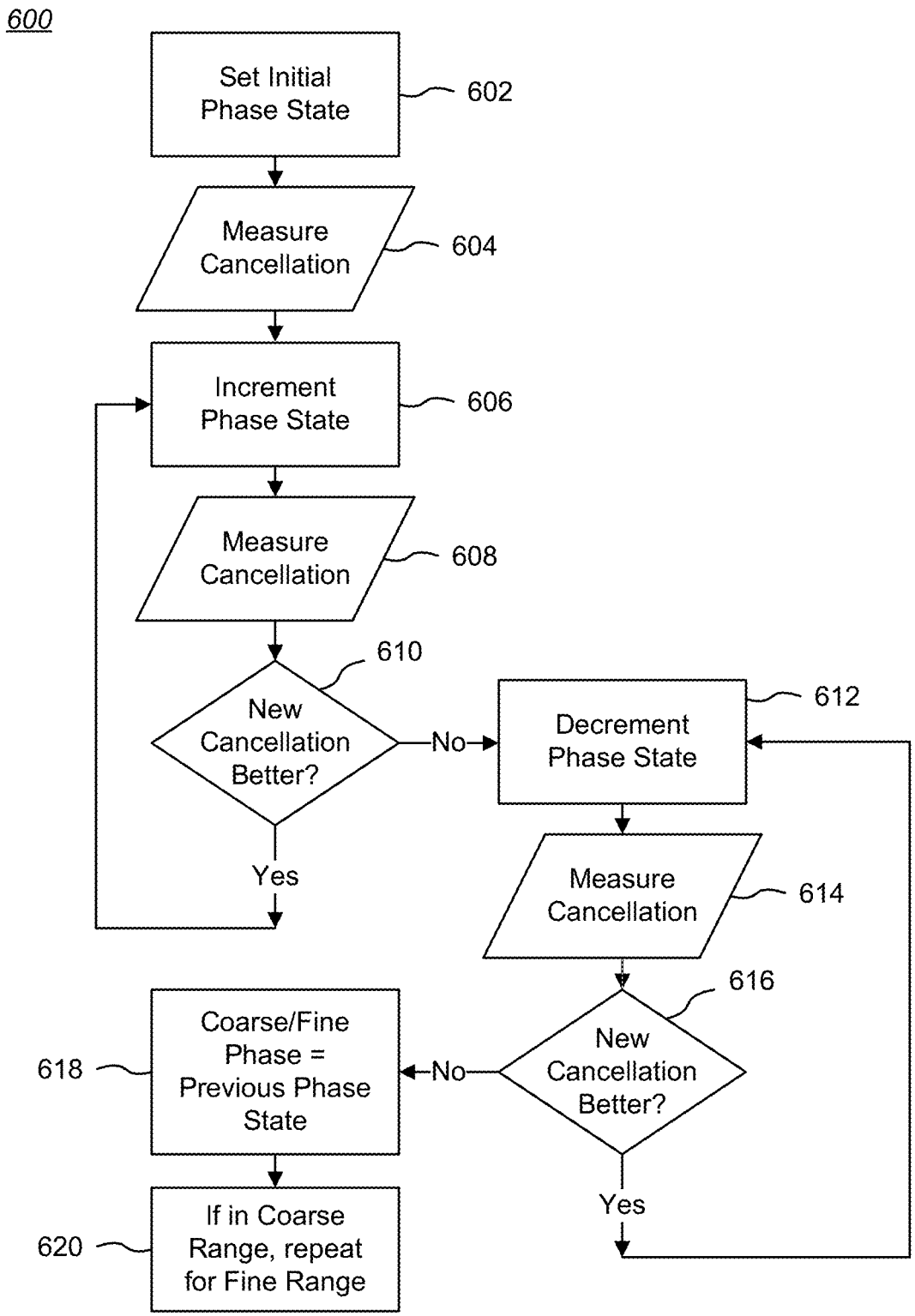
FIG. 6 is a process chart of one method for tuning the phase shifter arrays of a digitally controlled phase shifter made in accordance with the present invention.

FIG. 6 is a process chart 600 of one method for tuning the phase shifter arrays of a digitally controlled phase shifter made in accordance with the present invention. Starting with the coarse array, an initial phase shift state is set by activating the cell corresponding to the MSB of the array (STEP 602). The amount of interference cancellation achieved with that setting is then measured (STEP 604). The phase shift state is then incremented (STEP 606), and the amount of interference cancellation is measured again (STEP 608). If the amount of interference cancellation is better with the new phase shift state setting (STEP 610), the phase shift state is again incremented (STEP 606) and the loop repeats. Conversely, if the amount of interference cancellation is not better with the new phase shift state setting (STEP 610), the phase shift state is decremented (STEP 612) and the amount of interference cancellation is measured again (STEP 614). If the amount of interference cancellation is better with the new phase shift state setting (STEP 616), the phase shift state is again decremented (STEP 612) and the loop repeats. Conversely, if the amount of interference cancellation is not better with the new phase shift state setting (STEP 616), the phase shift state is for the array is set (STEP 618) at the phase shift state existing just before the last execution of STEP 616. If the calibration process has finished for the coarse array, the same process repeats for the fine array (STEP 620).

Integrated circuit (IC) embodiments of digitally controlled phase shifter and attenuator circuits in accordance with the present invention may be tested and characterized by conventional testing means used for phase shifter and attenuator circuits, and packaged in a manner suitable for RF circuits, either alone or as part of a larger circuit or system. For example, characterization of such an IC may be performed by setting nominal phase and attenuation states for the circuit corresponding to digital control words and measuring the resultant phase shift and level of attenuation over a range of conditions (e.g., frequency, temperature). The resultant mapping of nominal state values to measured values may be stored in a look-up table on the IC or within external circuitry, and used to set phase and attenuation states for applications such as interference cancellation (e.g., in conjunction with the method set forth in FIG. 6).

Benefits

Embodiments of the coarse+fine architecture described above have both a broad range as well as a fine-tuning resolution of amplitude and phase, maintains monotonic behavior across the entire range of possible phase shift and attenuation states, and compensates for the effect of frequency and/or PVT variations on circuit cells. It is believed that the coarse+fine architecture enables, for the first time in RF circuits, coarse and fine ranges applied to both phase shifter and attenuation arrays, use of 9 bits or more of resolution for phase shifting, use of 9 bits or more of resolution for attenuation, and use of 7 bits or more of resolution for phase shifting and attenuation combined.

Methods

Another aspect of the invention includes methods selectively altering the phase and/or attenuation of an applied radio frequency (RF) signal. For example, one such method includes providing excess full range coverage for at least one of phase shifting and attenuation, and providing at least one fine range for at least one of phase shifting and attenuation that is greater than the LSB of the corresponding next coarser range for phase shifting and attenuation.

Another such method includes providing n series-coupled circuit arrays, where n≥2, each circuit array having a least significant bit (LSB) phase shift or attenuation state, and configuring at least one of the n circuit arrays to have a range of phase shift or attenuation states that exceeds the LSB phase shift or attenuation state of a coupled different circuit array.

As another example, one method includes: providing a digitally controlled coarse phase shifter array having a least significant bit (LSB) phase shift state, and providing a digitally controlled fine phase shifter array, coupled to the coarse phase shifter array, and having a range of phase shift states, wherein the coarse phase shifter array and the fine phase shifter array together provide for greater than a 360° range for phase shifting the applied RF signal, and wherein the range of phase shift states of the fine phase shifter array exceeds the LSB phase shift state of the coarse phase shifter array.

Another such method includes: providing a digitally controlled coarse phase shifter array and a fine phase shifter array that together provide for greater than a 360° range for phase shifting the applied RF signal, wherein the coarse phase shifter array includes a least significant bit (LSB) phase shift state, and the range of phase shift states of the fine phase shifter array exceeds the LSB phase shift state of the coarse phase shifter array, and providing a digitally controlled coarse attenuator array and a fine attenuator array that together provide a targeted attenuation range with a selected degree of margin for attenuating the applied RF signal, wherein the coarse attenuator array includes a least significant bit (LSB) attenuation state, and the range of attenuation states of the fine attenuator array exceeds the LSB attenuation state of the coarse attenuator array.

Yet another such method includes: providing a coarse phase shifter array for providing a selectable degree of coarse phase shifting to the applied RF signal in response to a first digital control signal, providing a fine phase shifter array for providing a selectable degree of fine phase shifting to the applied RF signal in response to a second digital control signal, providing a coarse attenuator array for providing a selectable degree of coarse attenuation to the applied RF signal in response to a third digital control signal, providing a fine attenuator array for providing a selectable degree of fine attenuation to the applied RF signal in response to a fourth digital control signal, and providing a digital control interface, coupled to the coarse and fine phase shifter arrays and the coarse and fine attenuator arrays, for generating the first, second, third, and fourth digital control signals in response to applied phase and attenuation state data.

A method for selectively altering the phase of an applied radio frequency (RF) signal includes providing a coarse phase shifter array having a least significant bit (LSB) phase shift state, and providing a fine phase shifter array, coupled to the coarse phase shifter array, and having a range of phase shift states that exceeds the LSB phase shift state of the coarse phase shifter array.

A method for selectively attenuating an applied radio frequency (RF) signal includes a coarse attenuation array having a least significant bit (LSB) attenuation state, and a fine attenuation array, coupled to the coarse attenuation array, and having a range of attenuation states that exceeds the LSB attenuation state of the coarse attenuation array.

Other aspects of the above methods include: the coarse phase shifter array and the fine phase shifter array together providing for greater than a 360° range for phase shifting; the coarse attenuator array and the fine attenuator array together providing for a range of attenuation that exceeds the nominal attenuation range of a conventional attenuation array of like size by at least 2%, or by at least 5%; the coarse phase shifter array and the fine phase shifter array together providing for greater than a 360° range for phase shifting, and the coarse attenuator array and the fine attenuator array together providing for greater than a 32 dB range of attenuation; the coarse phase shifter array including a least significant bit (LSB) phase shift state, and the range of phase shift states of the fine phase shifter array exceeding the LSB phase shift state of the coarse phase shifter array; the coarse attenuator array including a least significant bit (LSB) attenuation state, and the range of attenuation states of the fine attenuator array exceeding the LSB attenuation state of the coarse attenuator array; the first digital control signals having a first binary weighting, and the second digital control signals having a second binary weighting; the third digital control signals having a third binary weighting, and the fourth digital control signals having a fourth binary weighting; the first and second digital control signals together including at least nine binary control bits; the third and fourth digital control signals together including at least nine binary control bits; the first and second digital control signals together including at seven binary control bits, and the third and fourth digital control signals together including at least seven binary control bits.

Another method for selectively altering the phase and/or attenuation of an applied RF signal includes: providing a coarse phase shifter array for providing a selectable degree of coarse phase shifting to the applied RF signal in response to a first digital control signal, providing a fine phase shifter array for providing a selectable degree of fine phase shifting to the applied RF signal in response to a second digital control signal, providing a coarse attenuator array for providing a selectable degree of coarse attenuation to the applied RF signal in response to a third digital control signal, providing a fine attenuator array for providing a selectable degree of fine attenuation to the applied RF signal in response to a fourth digital control signal, and providing a digital control interface, coupled to the coarse and fine phase shifter arrays and the coarse and fine attenuator arrays, for generating the first, second, third, and fourth digital control signals in response to applied phase and attenuation state data, wherein the coarse phase shifter array and the fine phase shifter array together provide for greater than a 360° range for phase shifting.

Other aspects of the above methods include: the coarse phase shifter array including a least significant bit (LSB) phase shift state, and the range of phase shift states of the fine phase shifter array exceeding the LSB phase shift state of the coarse phase shifter array; the coarse attenuator array including a least significant bit (LSB) attenuation state, and the range of attenuation states of the fine attenuator array exceeding the LSB attenuation state of the coarse attenuator array.

Fabrication Technologies and Options

While the above embodiments and description have focused on phase shifter circuits, in alternative embodiments, time delay circuits may be used instead of phase shifter circuits because one is related to the other at a particular frequency—thus, time=phase/(360*frequency). Accordingly, one of ordinary skill in the art would know how to utilize time delay circuits in lieu of phase shifter circuits.

As noted above, many phase shifter circuits also include a digitally controlled RF signal attenuator circuit that provides a discrete set of signal amplitude attenuation states that are also selected by a binary control word. Conversely, for some applications, the phase shifter component circuit may be used alone. For example, embodiments of the invention that omit the coarse and fine attenuator arrays 410, 414 in the circuit of FIG. 4A are useful in a number of applications.

The teachings of the present disclosure may be combined with the teaching of U.S. patent application Ser. No. 14/752,353, filed Jun. 26, 2015, entitled "State Change Stabilization in a Phase Shifter/Attenuator", assigned to the assignee of the present invention and hereby incorporated by reference. The reference application teaches, among other things, (1) utilizing control signals for a digital phase shifter to provide a selectable attenuation as a function of the applied phase shift state control words to substantially equalize insertion loss variations between phase shift states selected by the applied phase shift state control words, and (2) utilizing the control signals for the digital attenuator to provide a selectable phase shift adjustment as a function of the applied attenuation state control words to substantially equalize phase variations between attenuation states selected by the applied attenuation control words.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (in excess of about 0.1 GHz, and particularly above about 5.0 GHz). Monolithic IC implementation is particularly useful since parasitic capacitances generally can be kept low (or at a minimum, kept uniform across all units, permitting them to be compensated) by careful design. Additional circuit components may be added to enhance the capabilities of the disclosed circuits and/or to provide additional functional without significantly altering the functionality of the disclosed circuits.

The term "MOSFET" technically refers to metal-oxide-semiconductors; another synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductors, but instead includes IGFETs in general.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A digitally controlled circuit for selectively altering at least one of phase of an applied radio frequency (RF) signal and attenuation of the applied RF signal, the digitally controlled circuit providing (1) excess full range coverage for at least one of phase shifting and attenuation, and (2) at least one fine range for at least one of phase shifting and attenuation that is greater than the LSB of the corresponding next coarser range for phase shifting or attenuation.

2. A digitally controlled circuit for selectively altering at least one of phase of an applied radio frequency (RF) signal and attenuation of the applied RF signal, including n series-coupled circuit arrays, where n≥2, each circuit array having a least significant bit (LSB) phase shift or attenuation state, and at least one of the n circuit arrays having a range of phase shift or attenuation states that exceeds the LSB phase shift or attenuation state of a coupled different circuit array.

3. A digitally controlled phase shifter circuit for selectively altering the phase of an applied radio frequency (RF) signal, including:
    (a) a coarse phase shifter array having a least significant bit (LSB) phase shift state; and
    (b) a fine phase shifter array, coupled to the coarse phase shifter array, and having a range of phase shift states that exceeds the LSB phase shift state of the coarse phase shifter array.

4. A digitally controlled attenuation circuit for selectively attenuating an applied radio frequency (RF) signal, including:
    (a) a coarse attenuation array having a least significant bit (LSB) attenuation state; and
    (b) a fine attenuation array, coupled to the coarse attenuation array, and having a range of attenuation states that exceeds the LSB attenuation state of the coarse attenuation array.

5. A digitally controlled phase shifter circuit for selectively altering the phase of an applied radio frequency (RF) signal, including:
    (a) a coarse phase shifter array having a least significant bit (LSB) phase shift state; and
    (b) a fine phase shifter array, coupled to the coarse phase shifter array, and having a range of phase shift states;
    wherein the coarse phase shifter array and the fine phase shifter array together provide for greater than a 360° range for phase shifting the applied RF signal, and wherein the range of phase shift states of the fine phase shifter array exceeds the LSB phase shift state of the coarse phase shifter array.

6. A digitally controlled phase shifter and attenuator circuit for selectively altering the phase and/or amplitude of an applied radio frequency (RF) signal, including:
    (a) a coarse phase shifter array and a fine phase shifter array that together provide greater than a 360° range for phase shifting the applied RF signal; and
    (b) a coarse attenuator array and a fine attenuator array that together provide a targeted attenuation range with a selected degree of margin for attenuating the applied RF signal;
    wherein the coarse phase shifter array includes a least significant bit (LSB) phase shift state, and the range of phase shift states of the fine phase shifter array exceeds the LSB phase shift state of the coarse phase shifter array; and
    wherein the coarse attenuator array includes a least significant bit (LSB) attenuation state, and the range of attenuation states of the fine attenuator array exceeds the LSB attenuation state of the coarse attenuator array.

7. A digitally controlled phase shifter and attenuator circuit for selectively altering the phase and/or amplitude of an applied radio frequency (RF) signal, including:
    (a) a coarse phase shifter array for providing a selectable degree of coarse phase shifting to the applied RF signal in response to a first digital control signal;
    (b) a fine phase shifter array for providing a selectable degree of fine phase shifting to the applied RF signal in response to a second digital control signal;
    (c) a coarse attenuator array for providing a selectable degree of coarse attenuation to the applied RF signal in response to a third digital control signal;
    (d) a fine attenuator array for providing a selectable degree of fine attenuation to the applied RF signal in response to a fourth digital control signal; and
    (e) a digital control interface, coupled to the coarse and fine phase shifter arrays and the coarse and fine attenuator arrays, for generating the first, second, third, and fourth digital control signals in response to applied phase and attenuation state data.

8. The invention of claim 7, wherein the coarse phase shifter array and the fine phase shifter array together provide for greater than a 360° range for phase shifting.

9. The invention of claim 7, wherein the coarse attenuator array and the fine attenuator array together provide for a range of attenuation that exceeds a nominal attenuation range of a conventional attenuation array having the same number of digital control bits by at least 2%.

10. The invention of claim 7, wherein the coarse attenuator array and the fine attenuator array together provide for a range of attenuation that exceeds a nominal attenuation range of a conventional attenuation array having the same number of digital control bits by at least 5%.

11. The invention of claim 7, wherein the coarse phase shifter array and the fine phase shifter array together provide for greater than a 360° range for phase shifting, and the coarse attenuator array and the fine attenuator array together provide for greater than a 32 dB range of attenuation.

12. The invention of claim 7, wherein the coarse phase shifter array includes a least significant bit (LSB) phase shift state, and the range of phase shift states of the fine phase shifter array exceeds the LSB phase shift state of the coarse phase shifter array.

13. The invention of claim 7, wherein the coarse attenuator array includes a least significant bit (LSB) attenuation state, and the range of attenuation states of the fine attenuator array exceeds the LSB attenuation state of the coarse attenuator array.

14. The invention of claim 7, wherein the first digital control signals have a first binary weighting, and the second digital control signals have a second binary weighting.

15. The invention of claim 7, wherein the third digital control signals have a third binary weighting, and the fourth digital control signals have a fourth binary weighting.

16. The invention of claim 7, wherein the first and second digital control signals together include at least nine binary control bits.

17. The invention of claim 7, wherein the third and fourth digital control signals together include at least nine binary control bits.

18. The invention of claim 7, wherein the first and second digital control signals together include at least seven binary control bits, and the third and fourth digital control signals together include at least seven binary control bits.

19. A digitally controlled phase shifter and attenuator circuit for selectively altering the phase and/or amplitude of an applied radio frequency (RF) signal, including:
(a) a coarse phase shifter array for providing a selectable degree of coarse phase shifting to the applied RF signal in response to a first digital control signal;
(b) a fine phase shifter array for providing a selectable degree of fine phase shifting to the applied RF signal in response to a second digital control signal;
(c) a coarse attenuator array for providing a selectable degree of coarse attenuation to the applied RF signal in response to a third digital control signal;
(d) a fine attenuator array for providing a selectable degree of fine attenuation to the applied RF signal in response to a fourth digital control signal; and
(e) a digital control interface, coupled to the coarse and fine phase shifter arrays and the coarse and fine attenuator arrays, for generating the first, second, third, and fourth digital control signals in response to applied phase and attenuation state data;
wherein the coarse phase shifter array and the fine phase shifter array together provide for greater than a 360° range for phase shifting.

20. The invention of claim 19, wherein the coarse phase shifter array includes a least significant bit (LSB) phase shift state, and the range of phase shift states of the fine phase shifter array exceeds the LSB phase shift state of the coarse phase shifter array.

21. The invention of claim 19, wherein the coarse attenuator array includes a least significant bit (LSB) attenuation state, and the range of attenuation states of the fine attenuator array exceeds the LSB attenuation state of the coarse attenuator array.

22. A method for selectively altering at least one of phase of an applied radio frequency (RF) signal and attenuation of the applied RF signal, including:
(a) providing excess full range coverage for at least one of phase shifting and attenuation; and
(b) providing at least one fine range for at least one of phase shifting and attenuation that is greater than the LSB of the corresponding next coarser range for phase shifting and attenuation.

23. A method for selectively altering at least one of phase of an applied radio frequency (RF) signal and attenuation of the applied RF signal, including
(a) providing n series-coupled circuit arrays, where n≥2, each circuit array having a least significant bit (LSB) phase shift or attenuation state; and
(b) configuring at least one of the n circuit arrays to have a range of phase shift or attenuation states that exceeds the LSB phase shift or attenuation state of a coupled different circuit array.

24. A method for selectively altering the phase of an applied radio frequency (RF) signal, including:
(a) providing a coarse phase shifter array having a least significant bit (LSB) phase shift state; and
(b) providing a fine phase shifter array, coupled to the coarse phase shifter array, and having a range of phase shift states that exceeds the LSB phase shift state of the coarse phase shifter array.

25. A method for selectively attenuating an applied radio frequency (RF) signal, including:
(a) providing a coarse attenuation array having a least significant bit (LSB) attenuation state; and
(b) providing a fine attenuation array, coupled to the coarse attenuation array, and having a range of attenuation states that exceeds the LSB attenuation state of the coarse attenuation array.

26. A method for selectively altering the phase of an applied radio frequency (RF) signal, including:
(a) providing a digitally controlled coarse phase shifter array having a least significant bit (LSB) phase shift state; and
(b) providing a digitally controlled fine phase shifter array, coupled to the coarse phase shifter array, and having a range of phase shift states;
wherein the coarse phase shifter array and the fine phase shifter array together provide for greater than a 360° range for phase shifting the applied RF signal, and wherein the range of phase shift states of the fine phase shifter array exceeds the LSB phase shift state of the coarse phase shifter array.

27. A method for selectively altering the phase and/or amplitude of an applied radio frequency (RF) signal, including:
(a) providing a digitally controlled coarse phase shifter array and a fine phase shifter array that together provide for greater than a 360° range for phase shifting the applied RF signal, wherein the coarse phase shifter array includes a least significant bit (LSB) phase shift state, and the range of phase shift states of the fine phase shifter array exceeds the LSB phase shift state of the coarse phase shifter array; and
(b) providing a digitally controlled coarse attenuator array and a fine attenuator array that together provide a targeted attenuation range with a selected degree of margin for attenuating the applied RF signal, wherein the coarse attenuator array includes a least significant bit (LSB) attenuation state, and the range of attenuation states of the fine attenuator array exceeds the LSB attenuation state of the coarse attenuator array.

28. A method for selectively altering the phase and/or amplitude of an applied radio frequency (RF) signal, including:
(a) providing a coarse phase shifter array for providing a selectable degree of coarse phase shifting to the applied RF signal in response to a first digital control signal;
(b) providing a fine phase shifter array for providing a selectable degree of fine phase shifting to the applied RF signal in response to a second digital control signal;
(c) providing a coarse attenuator array for providing a selectable degree of coarse attenuation to the applied RF signal in response to a third digital control signal;
(d) providing a fine attenuator array for providing a selectable degree of fine attenuation to the applied RF signal in response to a fourth digital control signal; and
(e) providing a digital control interface, coupled to the coarse and fine phase shifter arrays and the coarse and fine attenuator arrays, for generating the first, second, third, and fourth digital control signals in response to applied phase and attenuation state data.

29. The method of claim 28, wherein the coarse phase shifter array and the fine phase shifter array together provide for greater than a 360° range for phase shifting.

30. The method of claim 28, wherein the coarse attenuator array and the fine attenuator array together provide for a range of attenuation that exceeds a nominal attenuation range of a conventional attenuation array having the same number of digital control bits by at least 2%.

31. The method of claim 28, wherein the coarse attenuator array and the fine attenuator array together provide for a range of attenuation that exceeds a nominal attenuation range of a conventional attenuation array having the same number of digital control bits by at least 5%.

32. The method of claim 28, wherein the coarse phase shifter array and the fine phase shifter array together provide for greater than a 360° range for phase shifting, and the coarse attenuator array and the fine attenuator array together provide for greater than a 32 dB range of attenuation.

33. The method of claim 28, wherein the coarse phase shifter array includes a least significant bit (LSB) phase shift state, and the range of phase shift states of the fine phase shifter array exceeds the LSB phase shift state of the coarse phase shifter array.

34. The method of claim 28, wherein the coarse attenuator array includes a least significant bit (LSB) attenuation state, and the range of attenuation states of the fine attenuator array exceeds the LSB attenuation state of the coarse attenuator array.

35. The method of claim 28, wherein the first digital control signals have a first binary weighting, and the second digital control signals have a second binary weighting.

36. The method of claim 28, wherein the third digital control signals have a third binary weighting, and the fourth digital control signals have a fourth binary weighting.

37. The method of claim 28, wherein the first and second digital control signals together include at least nine binary control bits.

38. The method of claim 28, wherein the third and fourth digital control signals together include at least nine binary control bits.

39. The method of claim 28, wherein the first and second digital control signals together include at least seven binary control bits, and the third and fourth digital control signals together include at least seven binary control bits.

40. A method for selectively altering the phase and/or amplitude of an applied radio frequency (RF) signal, including:
 (a) providing a coarse phase shifter array for providing a selectable degree of coarse phase shifting to the applied RF signal in response to a first digital control signal;
 (b) providing a fine phase shifter array for providing a selectable degree of fine phase shifting to the applied RF signal in response to a second digital control signal;
 (c) providing a coarse attenuator array for providing a selectable degree of coarse attenuation to the applied RF signal in response to a third digital control signal;
 (d) providing a fine attenuator array for providing a selectable degree of fine attenuation to the applied RF signal in response to a fourth digital control signal; and
 (e) providing a digital control interface, coupled to the coarse and fine phase shifter arrays and the coarse and fine attenuator arrays, for generating the first, second, third, and fourth digital control signals in response to applied phase and attenuation state data;
 wherein the coarse phase shifter array and the fine phase shifter array together provide for greater than a 360° range for phase shifting.

41. The method of claim 40, wherein the coarse phase shifter array includes a least significant bit (LSB) phase shift state, and the range of phase shift states of the fine phase shifter array exceeds the LSB phase shift state of the coarse phase shifter array.

42. The method of claim 40, wherein the coarse attenuator array includes a least significant bit (LSB) attenuation state, and the range of attenuation states of the fine attenuator array exceeds the LSB attenuation state of the coarse attenuator array.

43. A method for tuning coarse and fine phase shifter arrays of a digitally controlled phase shifter circuit, including starting with the coarse phase shifter array and:
 (a) setting an initial phase shift state;
 (b) measuring an amount of interference cancellation achieved with the setting;
 (c) incrementing the phase shift state;
 (d) measuring the amount of interference cancellation achieved;
 (e) if the amount of measured interference cancellation is better with the new phase shift state setting, then repeating steps (c) and (d), and otherwise proceeding to step (f);
 (f) decrementing the phase shift state;
 (g) measuring the amount of interference cancellation achieved;
 (h) if the amount of measured interference cancellation is better with the new phase shift state setting, then repeating steps (f) and (g);
 (i) setting the phase shift state for the array at the phase shift state existing just before the last execution of step (h); and
 (j) if the process has finished for the coarse array, repeating steps (a)-(i) for the fine phase shifter array.

* * * * *